Patented Dec. 3, 1935

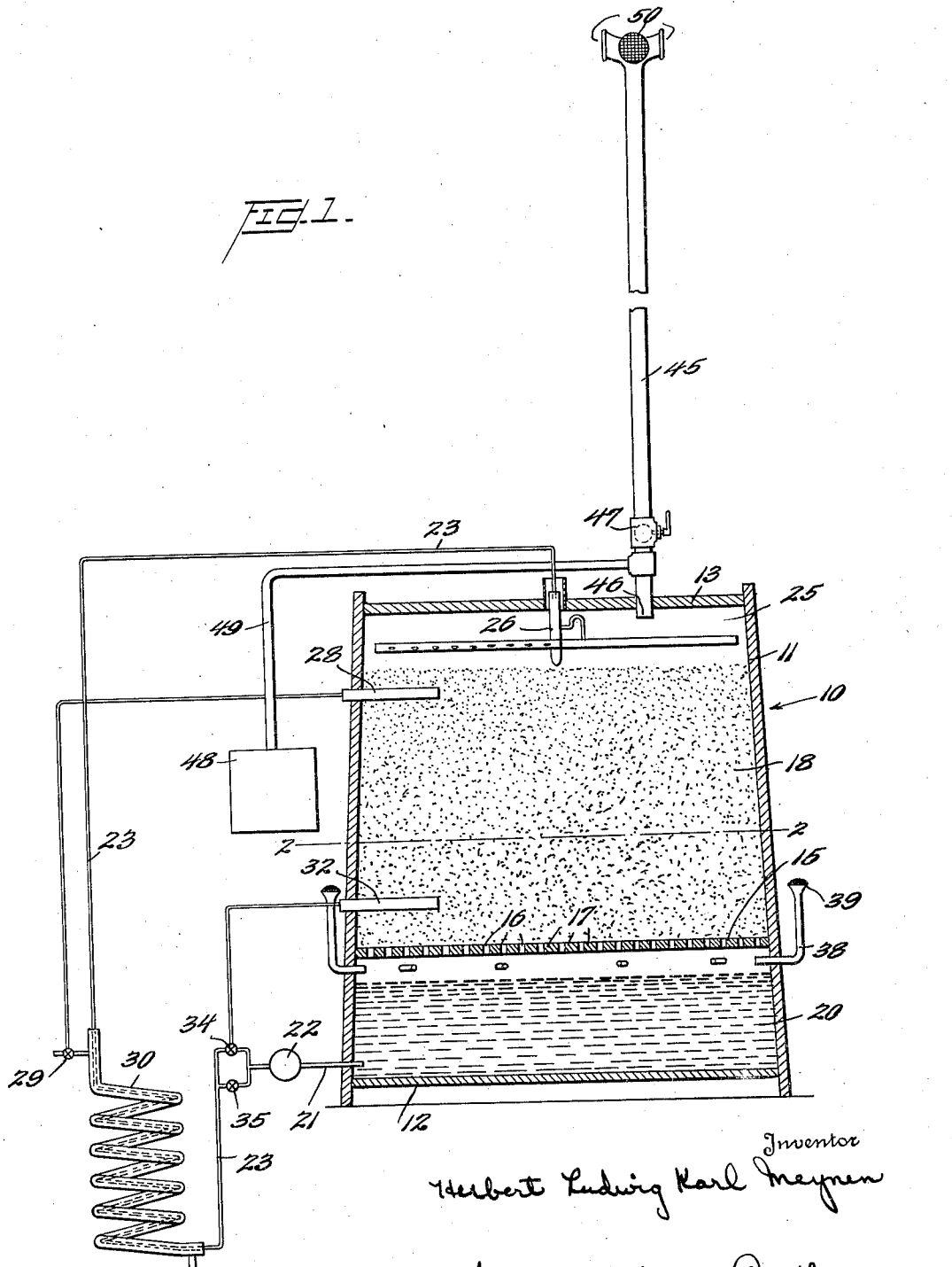

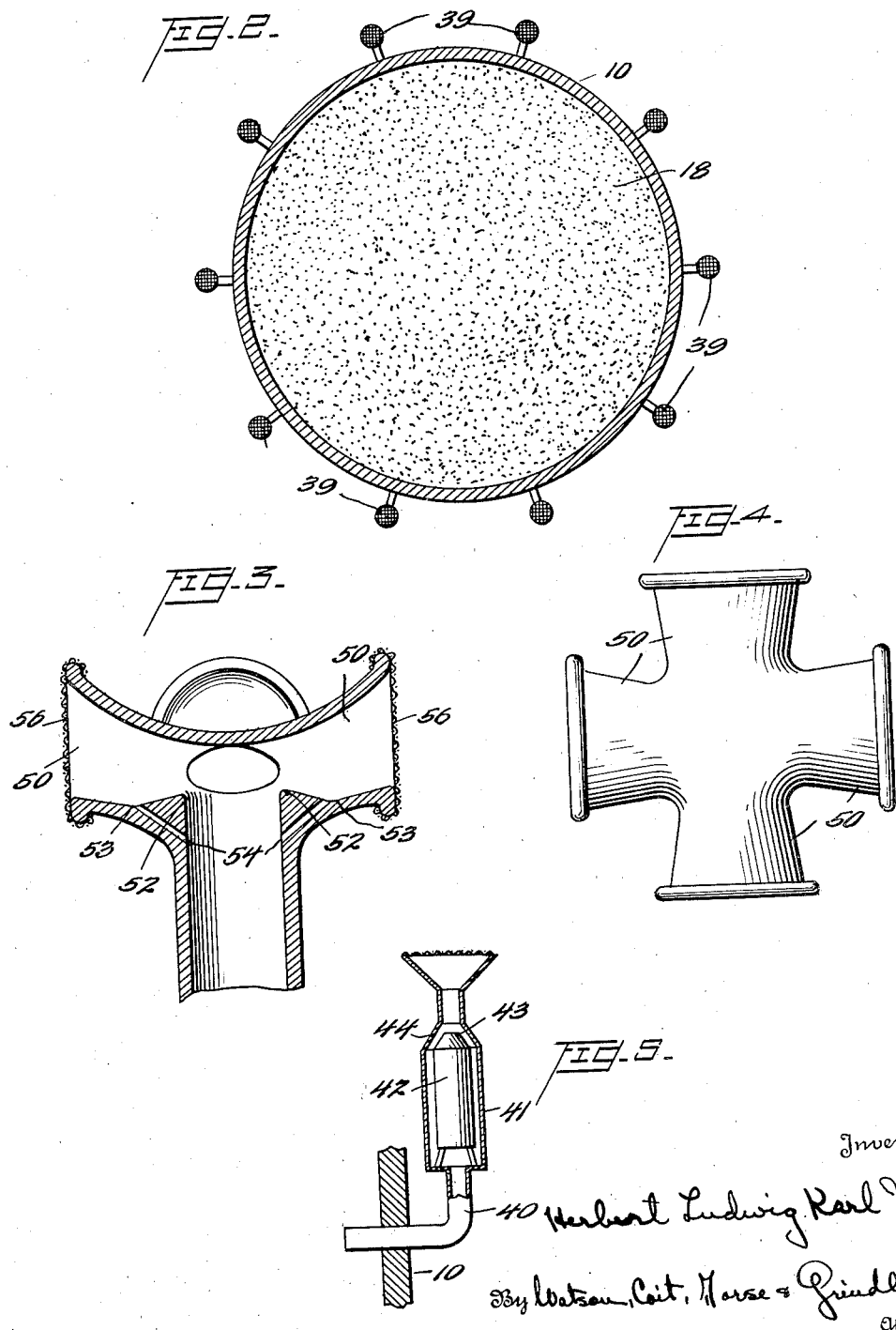

2,022,970

UNITED STATES PATENT OFFICE 2,022,970

APPARATUS FOR MANUFACTURING VINEGAR

Hubert Ludwig Karl Meynen, Bonn-on-the-Rhine, Germany, assignor to Standard Brands Incorporated, New York, N. Y., a corporation of Delaware Application September 10, 1932, Serial No. 632,604
Renewed April 27, 1935

9 Claims.  (Cl. 99—2)

This invention relates to apparatus for making vinegar, and has for its object the provision of means for regulating the flow of air through such apparatus.

In the U. S. Letters Patent granted to Heinrich Frings, No. 1,880,381, October 4, 1932, a process and apparatus for manufacturing vinegar are described in which a fluid mixture capable of undergoing acetic fermentation, commonly referred to as a mix, is caused to flow downwardly through a vat or generator which is filled with wood shavings or chips. The fluid mixture, consisting largely of alcohol, is converted in the presence of oxygen into acetic acid with the evolution of heat when exposed to the action of vinegar bacteria with which the chips are impregnated.

In the process disclosed in the prior application of Frings, the oxygen is supplied to the generator by means of a plurality of air vents communicating with the lower portion of the generator, which may be conveniently referred to as the lower zone, and an outlet is provided in the upper portion of the generator, hereinafter referred to as the upper zone, for withdrawing air and such vinegar and alcohol vapor as is carried out with the air. The process is of the type in which the vinegar mix is repeatedly circulated through the generator, being withdrawn from the lower zone which serves as a collecting chamber and pumped through a refrigerating coil to an inlet in the upper zone from which it is distributed above the interior of the generator and falls by gravity through the mass of chips which contains the bacteria.

In carrying out the Frings process the inlets in the lower zone of the generator are so arranged as to be normally above the level of the mix collected in this zone during normal operation of the apparatus, that is to say, while the liquid is being continuously circulated through the system. If, however, the circulation of the mix should be retarded or interrupted, for instance by the failure of the pump, the continuance of fermentation by introduction of air to the generator through the inlet openings will rapidly heat the interior of the generator to a temperature above that at which the vinegar bacteria can exist. Thus any accidental interruption of circulation will necessitate the recharging of the chips with the vinegar bacteria, a process which requires at least several weeks, before the generator can be again operated at full capacity. Furthermore, the interruption to the circulation frequently results in over-oxidation of the mix with the result that any vinegar which has formed is converted into carbon dioxide and water.

It is therefore an object of the present invention to provide means whereby on interruption of the circulation of the mix the supply of air to the generator is automatically discontinued. With such an arrangement, a generator in which a failure has occurred may be started again at any time within forty-eight hours and the process continued without the loss of vinegar and without destruction of the bacteria with which the chips are impregnated.

It is a further object of the invention to provide means whereby the flow of air during normal operation of the generator can be accurately regulated, this means preferably comprising a single control valve associated with the outlet of the generator. By means of this arrangement the flow of air through the entire series of air inlets may be effectively regulated by a single valve and at the same time the throttling of air and vapor at the outlet rather than at the inlet serves to reduce the amount of alcohol and vinegar vapor carried out with the generator with the discharging air.

A further object of the invention is the provision of means associated with the vapor outlet of the generator and the usual outlet draft stack for ensuring uniform discharge of air regardless of change in the velocity and direction of movement of air in the vicinity of the stack and for further reducing the amount of vapor discharging from the generator.

Further objects and features of the invention will be apparent from the following description taken in connection with the accompanying drawings, in which Figure 1 is a vertical sectional view of a generator illustrating the principles of the present invention;

Figure 2 is a horizontal sectional view on the line 2—2 of Figure 1;

Figure 3 is a vertical sectional view of one element shown in Figure 1;

Figure 4 is a plan view of the device shown in Figure 3; and

Figure 5 is a fragmentary sectional view of a modified form of air inlet control device.

In order to facilitate an understanding of the invention, the preferred embodiment illustrated in the drawings is described in detail. It will nevertheless be understood that the specific construction selected for the purpose of illustration may be varied to a considerable extent and that such changes and alterations are contemplated as fall within the spirit and scope of the claims appended to the specification.

Referring now to the drawings, it will be observed that Figure 1 discloses a generator designated generally at 10 consisting of a substantially cylindrical body 11 enclosed at the lower and upper ends by the members 12 and 13 respectively. A partition 15 which is apertured as indicated at 16, preferably by forming the partition with a plurality of spaced transversely extending members 17, serves to support the chips or shavings 18, it being understood that the term "chips" is used herein to refer to any suitable material in which the vinegar bacteria may lodge and which will effect retardation of the downward flow of the mix.

The recirculation process disclosed in the Frings application above referred to depends primarily for its successful operation on the provision of means serving to accurately control the temperature of the mix in accordance with temperature conditions existing within the generator, it being appreciated that the heat liberated within the generator as a result of the conversion of alcohol to acetic acid increases the temperature of the mix, so that it is necessary to provide a cooling device, preferably arranged exteriorly of the generator. For this purpose, the mix is withdrawn from that portion 20 of the generator 10 below the partition 15, herein referred to as the lower zone, by means of an outlet conduit 21, and is delivered by means of a pump 22 to a return conduit 23 from which it is redistributed in the upper zone 25 of the generator by any suitable means, for instance a rotary distributing device 26 which may be constructed in the manner described in the aforementioned Frings application. A thermostat 28 extending into the upper portion of the generator serves to control a valve 29 to regulate the flow of fluid refrigerant in the cooling device 30 which may consist of the usual refrigerating coil surrounding the return pipe 23. The flow of mix through the system is also automatically regulated by means of a thermostat 32 which serves to control a valve 34 which acts as a by-pass around the manually controlled valve 35. Thus both the flow of mix and the temperature of the mix are controlled in such manner that the operation may be carried on continuously until the conversion of the alcohol into vinegar is practically complete.

When the generator described in the Frings application is properly operated, a reservoir of mix such as is shown in Figure 1 of the drawings forming a part of this application, is always present in the lower zone 20 of the generator, the level of the mix in this zone being somewhat below the partition 15 on which the chips 18 are supported. If, however, the pump 22 ceases to operate or if for any other reason the circulation of mix is retarded, the mix falling through the chips 18 will accumulate in the lower zone 20 and raise the level of the liquid in this zone. Thus if air inlet apertures are provided beneath the partition 15, the rising liquid will spill out of the apertures and air will continue to pass through the generator thus resulting in destruction of the bacteria and over-oxidation of any vinegar which may have been formed. Even though the inlet apertures are arranged at a height sufficient to prevent overflow of the mix, the continued flow of air through the generator when the circulation is stopped will destroy the bacteria.

In order to avoid this serious defect in generators heretofore constructed, the present invention contemplates the provision of a plurality of inlet conduits 38 communicating with the lower zone of the generator above the normal level of liquid in that zone, that is to say, above the level which obtains when the liquid is being properly circulated, and below the partition 15. The conduits 38 are extended upwardly exteriorly of the generator and are preferably provided at their outer ends with flared mouths 39 which may be covered by any suitable device, such as a horsehair screen, for preventing the entry of dust and impurities into the generator. In order to prevent overflow of the mix from these inlet conduits 38 when the circulation is stopped, it is obvious that the conduits must extend exteriorly of the generator to a point higher than the level attained by the mix on collection of the major portion of the mix in the lower zone of the generator, it being observed that a considerable portion of the mix will always remain in the return pipe 23 and associated connections although the circulation may be completely stopped.

Thus upon failure of the pump 22, the major portion of the mix will rise above the point at which the lower ends of the inlet conduits 38 communicate with the generator to completely seal the generator and exclude further air therefrom. Under such conditions the overheating of the mass of chips within the generator is not possible and under ordinary conditions there is no difficulty whatever in remedying the defect in the pump and renewing the circulation of the mix and bacteria are not destroyed by the high temperature.

While the air controlled device hereinbefore described is found to be extremely effective in operation and simple and inexpensive to construct, I may employ a modified arrangement similar to that shown in Figure 5 of the drawings in which the inlet conduit 40 is provided intermediate its ends with an enlarged portion 41 in which is supported a float valve 42 having a plurality of legs which serve as a support for the valve during normal operation of the device and in the absence of liquid in the enlarged portion 41 of the inlet conduit. The upper end 43 of the float valve is of substantially conical shape and cooperates with an upwardly tapering constricted portion 44 of the inlet conduit, the latter forming a seat for the valve when the valve is raised.

Thus when the level of the mix rises as the result of failure of the circulating system, the mix will flow into the enlarged portion 41 of the inlet conduit 40 and the valve 42 will float upwardly into engagement with the seat 44, thereby closing the conduit and preventing further ingress of air, and outflow of the liquid.

It is extremely important to ensure that the proper quantity of air will be admitted to the generator during operation and to ensure that the air will be distributed uniformly about the circumference of the generator. It is for this purpose that the generator is provided with a plurality of inlet conduits 38, and it is obviously difficult to control accurately the flow of air by effecting separate regulation of each of these conduits.

In order to obviate this difficulty, the flue or draft stack 45 which communicates with the single outlet 46 in the upper zone of the generator is provided intermediate its ends with a valve 47 which may be manually controlled. Thus the flow of air through all of the inlets may be accurately regulated by operation of the single valve 47 associated with the outlet of the generator through which the exhaust air and any vapor carried thereby is discharged. It will be observed that the location of the control valve in this position reduces the amount of vapor carried out with the exhaust air and thereby increases the efficiency of the generator, it being well recognized that the throttling of a gas in which vapor is suspended tends to condense the vapor, which is thus returned to the generator. This is due partly to the difference in pressure on opposite sides of the valve and to the expansion of the vapor-laden air in passing through the valve.

Accurate control of the flow of air in the Frings generator is important if the process is to be carried out economically, and the manipulation of the valve 47 is preferably effected in accordance with the composition of the exhaust gas as indicated by a conventional form of testing device 48 which is connected with the stack 45 by means of a conduit 49.

It is customary to exhaust the air from generators of this type outside of the building in which the generator is located, and thus the upper end of the stack is subjected to the action of winds which are constantly changing in velocity and direction. In order that the flow of air through the generator may not be affected by such changes in conditions, the arrangement shown more particularly in Figures 3 and 4 of the drawings is provided in the upper end of the stack 45. This device consists primarily of a plurality of discharge passages 50 extending radially outward of the stack, it being preferable to provide at least four of these passages. Thus a current of air passing in one of these passages 50 will pass out of the opposing passage without affecting the draft through the stack.

In order to facilitate the expulsion of exhaust air from the stack, the inner lip 52 of each passage 50 is directed slightly upwardly, as shown in Figure 3 of the drawings, to divert the air and prevent any decided downward movement thereof within the stack, the effect of flow of currents of air through the passages 50 thus facilitating rather than hindering the discharge of exhaust air. The lower wall of each passage is furthermore formed with a dished portion 53 which communicates with the interior of the stack through a vent 54. The vapors which may be condensed in the passages 50 are thus collected in these dished portions 53 of the passages and are returned by the vent 54 to the stack and thence to the generator. If desired the outer open end of each passage 50 may be covered with a horsehair screen 56 or the like to prevent the entry of impurities into the generator through the stack.

It will be observed from the foregoing description that the invention contemplates the regulation and control of the flow of air under varying conditions throughout the entire system, the arrangement being such that with the exception of the required manual operation of the valve 47 the regulation is effected automatically and in such manner as to ensure most efficient functioning of the generator. It has been found that in recirculating generators employing the arrangement shown in this application it is difficult to detect the presence of the generator, the characteristic odor of the usual vinegar generator being absent owing to the fact that little or no acid vapor is allowed to escape.

Having thus described the invention, what is claimed as new and desired to be secured by Letters Patent is:

1. In apparatus for making vinegar, the combination with a generator, of means for continuously circulating vinegar mix through said generator, and means for introducing air into said generator during normal operation thereof and for excluding air from said generator and preventing discharge of mix therefrom on failure of said first named means to circulate the mix.

2. In apparatus for making vinegar, the combination with a generator, of means for continuously circulating vinegar mix through said generator, and means for introducing air into said generator during normal operation thereof and for excluding air from said generator and preventing discharge of mix therefrom on failure of said first named means to circulate the mix, said last named means comprising an air inlet device communicating with the interior of the generator at a point disposed slightly above the normal level of collected mix in the generator.

3. In apparatus for making vinegar, the combination with a generator, of means for continuously circulating vinegar mix through said generator, and means for introducing air into said generator during normal operation thereof and for excluding air from said generator on failure of said first named means to circulate the mix, said last named means comprising an air inlet device communicating with the interior of the generator at a point disposed slightly above the normal level of collected mix in the generator, and extending exteriorly of the generator above the level to which the mix will rise when circulation is interrupted.

4. In apparatus for making vinegar, the combination with a generator having an upper zone adapted to receive vinegar chips or the like and a lower zone serving as a collecting chamber for the mix discharged through the chips, of means including a closed circuit for withdrawing the mix from the lower zone and introducing the same in the upper zone to effect repeated circulation of the mix through the generator, and means for introducing air into the lower zone of the said generator during circulation of the mix and for completely excluding air from the generator and preventing discharge of mix therefrom on failure of said first named means to circulate the mix.

5. In apparatus for making vinegar, the combination with a generator having an upper zone adapted to receive vinegar chips or the like and a lower zone serving as a collecting chamber for the mix discharged through the chips, of means including a closed circuit for withdrawing the mix from the lower zone and introducing the same in the upper zone to effect repeated circulation of the mix through the generator, and means for introducing air into the lower zone of the said generator during circulation of the mix and for completely excluding air from the generator and preventing discharge of mix therefrom on failure of said first named means to circulate the mix, said last named means comprising an air inlet device communicating with the interior of the generator below the upper zone and extending upwardly exteriorly of the generator, whereby the rising of the mix in the lower zone on interruption of circulation will effect sealing of the device.

6. In apparatus for making vinegar, the combination with a generator having an upper zone adapted to receive vinegar chips or the like and a lower zone serving as a collecting chamber for the mix discharged through the chips, of means including a closed circuit for withdrawing the mix from the lower zone and introducing the same in the upper zone to effect repeated circulation of the mix through the generator, and means for introducing air into the lower zone of the said generator during circulation of the mix and for completely excluding air from the generator on failure of said first named means to circulate the mix, said means including an inlet device communicating with the interior of the generator, and fluid operated closure means associated with said inlet device and operable by rising of the mix on interruption of circulation to close said inlet device.

7. In apparatus for making vinegar, the combination with a generator having an upper zone adapted to receive vinegar chips or the like and a lower zone serving as a collecting chamber for the mix discharged through the chips, of means including a closed circuit for withdrawing the mix from the lower zone and introducing the same in the upper zone to effect repeated circulation of the mix through the generator, and means for introducing air into the lower zone of the said generator during circulation of the mix and for completely excluding air from the generator on failure of said first named means to circulate the mix, said means including an inlet device communicating with the interior of the generator, and a float operated valve for closing said inlet device when the mix rises in the lower zone of the generator on interruption of circulation.

8. In apparatus for making vinegar, the combination with a generator having an upper zone adapted to receive vinegar chips or the like and a lower zone serving as a collecting chamber for the mix discharged through the chips, of means including a closed circuit for withdrawing the mix from the lower zone and introducing the same in the upper zone to effect repeated circulation of the mix through the generator, and means for introducing air into the lower zone of the said generator and preventing discharge of mix therefrom during circulation of the mix and for completely excluding air from the generator on failure of said first named means to circulate the mix, said last named means comprising a plurality of air inlet devices arranged in spaced relation about the generator, a vapor outlet communicating with the upper zone of the generator, and means associated with said outlet for throttling the vapor discharging from the generator.

9. In apparatus for making vinegar, the combination with a generator, of means for repeatedly circulating vinegar mix through the generator, said generator having a vapor outlet, a substantially vertically disposed stack extending from said outlet, a vapor discharge passage extending radially outward of the stack, said passage having a dished portion therein for the collection of vapor condensate, and a vent affording communication between the said dished portion of the passage and the interior of the stack for returning condensate to the latter.

HUBERT LUDWIG KARL MEYNEN.